Figure 1:
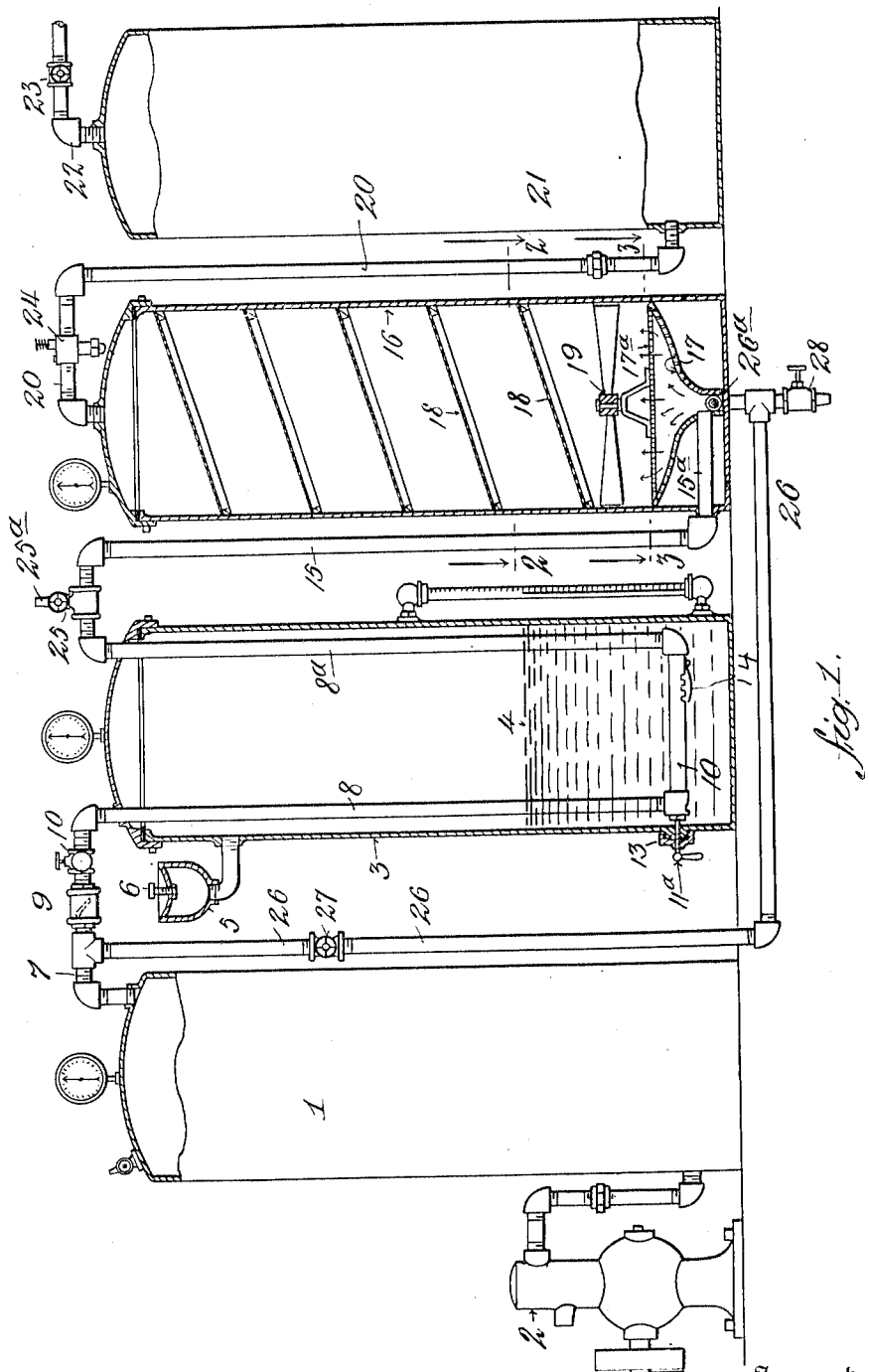

W. A. DOUGHERTY.
MEANS FOR CARBURETING AIR.
APPLICATION FILED JAN. 16, 1912.

1,118,897.

Patented Nov. 24, 1914.
2 SHEETS—SHEET 1.

Witnesses:
Inventor
W. A. Dougherty,
By his Attorney
T. F. Bourne

W. A. DOUGHERTY.
MEANS FOR CARBURETING AIR.
APPLICATION FILED JAN. 16, 1912.
1,118,897.
Patented Nov. 24, 1914.
2 SHEETS—SHEET 2.
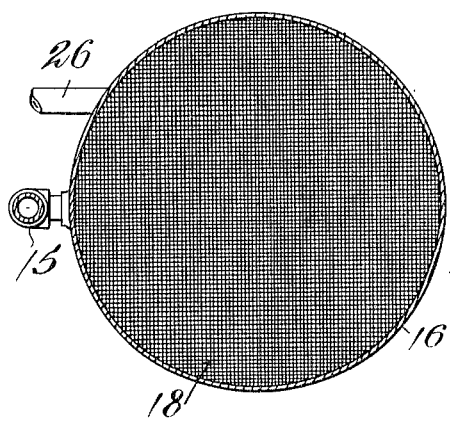
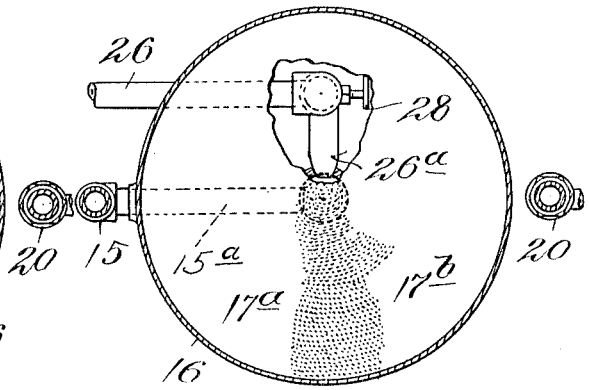
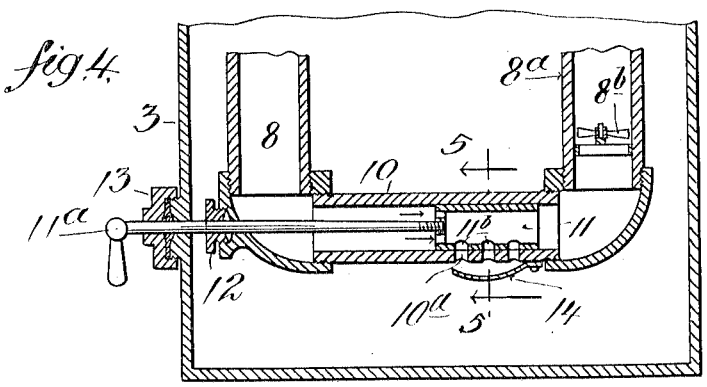
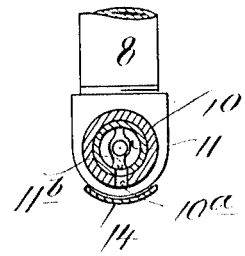
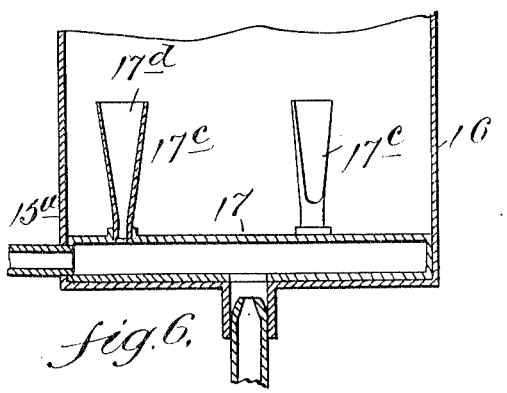
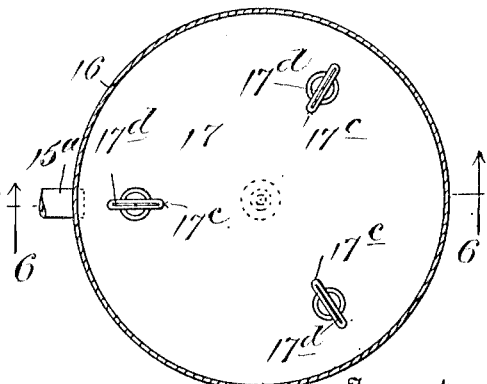
Witnesses:
Inventor
W. A. Dougherty
By his Attorney
T. F. Bourne

UNITED STATES PATENT OFFICE.

WILLIAM A. DOUGHERTY, OF NEW YORK, N. Y., ASSIGNOR TO POLAR GAS COMPANY, OF NEW YORK, N. Y., A CORPORATION OF NEW YORK.

MEANS FOR CARBURETING AIR.

1,118,897.   Specification of Letters Patent.   Patented Nov. 24, 1914.

Application filed January 16, 1912. Serial No. 671,435.

*To all whom it may concern:*

Be it known that I, WILLIAM A. DOUGHERTY, a citizen of the United States, and resident of New York city, borough of the Bronx, in the county of New York and State of New York, have invented certain new and useful Improvements in Means for Carbureting Air, of which the following is a specification.

The object of my invention is to produce inflammable mixture from hydrocarbon oil, such as kerosene, capable of use for illumination, power, and other purposes.

My invention comprises novel details of improvement and combination of parts that will be more fully hereinafter set forth and then pointed out in the claims.

Reference is to be had to the accompanying drawings forming part hereof, wherein, Figure 1 is a partly sectional side elevation of an apparatus embodying my invention; Fig. 2 is an enlarged sectional view on the line 2, 2, in Fig. 1; Fig. 3 is a similar view on the line 3, 3, in Fig. 1; Fig. 4 is an enlarged detail section through the lower portion of chamber 3; Fig. 5 is a section on the line 5, 5, in Fig. 4; Fig. 6 is a sectional detail of a modification of the lower portion of chamber 16, the section being taken on the line 6, 6, in Fig. 7, and Fig. 7 is a plan view of Fig. 6.

Similar numerals of reference indicate corresponding parts in the several views.

The numeral 1 indicates a tank or vessel adapted to contain a supply of compressed air, which may be supplied thereto by any suitable air compressor, indicated at 2.

At 3 is a chamber or tank of suitable construction adapted to contain hydrocarbon oil or the like, such as kerosene oil, indicated at 4.

At 5 is a suitable filling device connected with chamber 3, the same being shown provided with a closure 6 adapted to resist air pressure in chamber 3. The tank 1 is connected, by suitable piping 7, with a pipe 8 leading to the lower portion of chamber 3, pipe 8 being shown depending within such chamber.

At 9 is a check valve to prevent return pressure from chamber 3 through pipe 8, and at 10 is a cock to shut off communication between tank 1 and chamber 3 when desired.

Pipe 8 communicates at its lower end with a substantially horizontally disposed pipe 10 provided with a suitable valve 11, the stem 11$^a$ of which is shown passing through suitable glands or packing 12, 13, to the exterior of chamber 3 for manipulation. Pipe 10 is provided with any desired number of openings 10$^a$, shown located at the lower part of said pipe, and valve 11 is shown provided with corresponding openings 11$^b$ to coact with the openings 10$^a$, whereby compressed air flowing through pipe 8 to pipe 10, and thence through pipe 8$^a$, may absorb and carry with it the desired proportion of hydrocarbon 4.

At 14 is indicated a plate at a desired distance below openings 10$^a$ of pipe 10, being shown secured to pipe 10, the plate 14 being shown curved beneath pipe 10, whereby any air that may blow through openings 10$^a$ into chamber 3 is deflected from the sides of plate 14. Within pipe 8$^a$ a fan 8$^b$ may be placed to assist in mixing the heavily charged carbureted air flowing through said pipe. A pipe 15 connects with pipe 8$^a$ and leads into the lower portion of receiving chamber 16, and is shown having a branch or outlet 15$^a$ within chamber 16 communicating with a casing or shell 17 in the lower part of chamber 16. Casing 17 is provided at its upper portion with outlets for causing fine division or comminution of the relatively heavily-charged air flowing from chamber 3 through pipe 15. For this purpose I have shown a top 17$^a$ on casing 17 provided with relatively minute orifices or perforations 17$^b$, which top may be of foraminous material. Within the chamber 16 are any desired number of screens 18, spaced at suitable distances apart one above another, and shown inclined, through which carbureted air is caused to flow.

At 19 is a fan of any suitable or wellknown construction located within chamber 16 and above casing 17, the fan being caused to rotate by the flow of carbureted air from casing 17, to aid in comminuting and mixing the same. Piping 20 communicates with chamber 16 and with a tank 21 having an outlet pipe 22, which may be controlled by a suitable valve 23. At 24 is shown a pressure-reducing or controlling valve, which may be of any wellknown construction, located in the line of pipe 20 to cause the delivery to tank 21 of carbureted air at any desired reduction below the pressure of the primary air in tank 1.

At 25 is a valve shown between pipes 8ᵃ and 15, which may be adapted to cut off communication between chambers 3 and 16, and also may permit exhaust of gas through the outlet 25ᵃ when required. From tank 1 pipe 26, which may be controlled by a valve 27, leads to casing 17, and is shown provided with a jet opening or nozzle 26ᵃ communicating with casing 17 beneath and thus adjacent to the delivery end of pipe 15ᵃ. A valve 28 may be provided to permit draining of chamber 16, casing 17, and pipe 26 when required.

In the modification shown in Figs. 6 and 7, instead of providing the top of chamber 17 with the orifices or perforations 17ᵃ, casing 17 may be provided with a desired number of outlets 17ᶜ shown having narrow slits or delivery nozzles 17ᵈ to cause heavily carbureted air flowing from casing 17 to be finely divided.

Air under desired pressure is maintained in tank 1, and chamber 3 is charged to the desired depth with hydrocarbon, such as kerosene oil, or other desired liquid, and valve 11 is set in the desired position, and then the compressed air is caused to flow through pipes 8, 10, 8ᵃ, 15 and 15ᵃ, whereupon such air will, in its passage through pipe 10, carry with it a portion of the hydrocarbon or oil to produce what may be termed a heavily-carbureted air which will flow, under pressure, into casing 17. Air under pressure is also caused to flow through pipe 26 and its nozzle 26ᵃ, and such air is delivered into casing 17 adjacent the delivery of the heavily-carbureted air into casing 17, and is blown into the stream of heavily-carbureted air, causing such heavily-carbureted air to be diluted and a mixture made of the desired carburetion, which carbureted-air will be caused to flow under pressure from casing 17 through the orifices or outlets thereof, and into chamber 16, and in its passage through the screens 18 will be caused to become more intimately mixed, the fan 19 aiding in producing such mixture. The thus-produced desired carbureted air will then be delivered into tank 21, under such pressure as desired by reason of the action of the reducing valve 24, and from tank 21 the carbureted air will be drawn for illuminating or power purposes, or for other desired uses.

By means of my invention it will be seen that the production of the desired carbureted air is continuous and without requiring heating the hydrocarbon.

A particular advantage of my invention is that kerosene oil may be minutely combined with the desired proportions of air in the production of a carbureted air or gas, without requiring the kerosene oil to be heated, thereby retaining in the kerosene oil all of its natural qualities to the point of consumption, as distinguished from the loss that may be otherwise occasioned where kerosene is heated to volatilize it, as for carburetion purposes, before it is consumed in the form of carbureted-air.

Changes may be made in the details of construction and arrangements set forth within the scope of the appended claims, without departing from the spirit of the invention, as for instance, instead of using tank 1, the pipes 7 and 26 may be connected direct with one or more sources of compressed air, having any desired pressure.

Having now described my invention what I claim is:—

1. The combination of means for producing compressed air, a chamber adapted to contain oil, a pipe having an opening below the oil level in said chamber, said pipe communicating with the compressed air means, means to control the opening in said pipe, a receiving chamber communicating with an outlet from said pipe to receive heavily carbureted air therefrom, and means connecting said receiving chamber with said compressed air means for discharging compressed air into said receiving chamber at the outlet of said pipe.

2. The combination of means for producing compressed air, a chamber adapted to contain oil, a pipe in said chamber communicating with the compressed air means, and submerged in the oil in said chamber, said pipe having an opening communicating with said oil, a valve controlling said opening and submerged in said oil, a receiving chamber having a carbureted air inlet communicating with said pipe, an air nozzle in the receiving chamber adjacent the carbureted air inlet, and means for blowing compressed air through said nozzle directly into commingling relation with carbureted air blown through said inlet.

3. The combination of means for producing compressed air, a chamber communicating therewith adapted to contain oil, a receiving chamber having an interior casing provided with orifices, a carbureted air inlet opening into said casing and communicating with the first named chamber, a nozzle opening into said casing, and means for blowing air through said nozzle into said casing in commingling relation with carbureted air therein.

4. The combination of means for producing compressed air, a chamber communicating therewith adapted to contain oil, a receiving chamber having an interior casing provided with orifices, a carbureted air inlet opening into said casing and communicating with the first named chamber, a nozzle opening into said casing, and means connecting said nozzle with said compressed air means for blowing air into said casing in commingling relation with carbureted air therein.

5. The combination of means for producing compressed air, a chamber communicating therewith adapted to contain oil, a receiving chamber having an interior casing provided with orifices, a carbureted air inlet opening into said casing and communicating with the first named chamber, a nozzle opening into said casing, and means connecting said nozzle with said compressed air means for blowing air into said casing in commingling relation with carbureted air therein, and a fan in the receiving chamber above said casing.

6. The combination of means for producing compressed air, a chamber communicating therewith adapted to contain oil, a receiving chamber having an interior casing provided with orifices, a carbureted air inlet opening into said casing and communicating with the first named chamber, a nozzle opening into said casing, means connecting said nozzle with said compressed air means for blowing air into said casing in commingling relation with carbureted air therein, and a screen in said receiving chamber above said casing.

7. The combination of means for producing compressed air, a chamber adapted to contain oil, piping leading through said chamber and communicating with said compressed air means, the piping within said chamber being provided with an opening, a valve to control said opening, a receiving chamber, a casing within the receiving chamber, a carbureted air inlet communicating with said casing and with said piping, a nozzle communicating with said casing, and means for blowing air through said nozzle.

8. The combination of means for producing compressed air, a chamber adapted to contain oil, piping leading through said chamber and communicating with said compressed air means, the piping within said chamber being provided with an opening, a valve to control said opening, a receiving chamber, a casing within the receiving chamber, a carbureted air inlet communicating with said casing and with said piping, a nozzle communicating with said casing, and means connecting said nozzle with said compressed air means for delivering air under the same pressure into said casing as the pressure of the carbureted air.

9. The combination of means for producing compressed air, a chamber adapted to contain oil, piping leading through said chamber and communicating with said compressed air means, the piping within said chamber being provided with an opening, a valve within said piping provided with an opening, means extending exterior of said casing for operating said valve, a receiving chamber, a casing within the receiving chamber, a carbureted air inlet communicating with said piping, a nozzle communicating with said casing, and means for blowing air through said nozzle.

10. The combination of means for producing compressed air, a chamber adapted to contain oil, piping leading through said chamber, and communicating with said compressed air means, the piping within said chamber being provided with an opening, a valve within said piping provided with an opening, means extending exterior of said casing for operating said valve, a receiving chamber, a casing within the receiving chamber, a carbureted air inlet communicating with said piping, a nozzle communicating with said casing, and means connecting said nozzle with said compressed air means for delivering air under the same pressure into said casing as the pressure of the carbureted air.

11. The combination of means for producing compressed air, a chamber adapted to contain oil, piping leading through said chamber and communicating with said compressed air means, the piping within said chamber being provided with an opening at the lower part, a valve to control said opening, a receiving chamber, a casing within the receiving chamber, a carbureted air inlet communicating with said casing and with said piping, a nozzle communicating with said casing, and means for blowing air through said nozzle.

12. The combination of means for producing compressed air, a chamber adapted to contain oil, piping leading through said chamber and communicating with said compressed air means, the piping within said chamber being provided with an opening at the lower part, and a plate below said opening and spaced from said piping, a valve to control said opening, a receiving chamber, a casing within the receiving chamber, a carbureted air inlet communicating with said casing and with said piping, a nozzle communicating with said casing, and means for blowing air through said nozzle.

Signed at New York city, in the county of New York and State of New York, this 15th day of January, A. D. 1912.

WILLIAM A. DOUGHERTY.

Witnesses:
A. M. PARISER,
T. F. BOURNE.